United States Patent [19]

Medley, III

[11] Patent Number: 4,802,979

[45] Date of Patent: Feb. 7, 1989

[54] FLUID FILTER HAVING SEPARABLE ELEMENTS AND REMOVABLE END CLOSURES

[76] Inventor: Frank W. Medley, III, 45 East 18th St., Cookeville, Tenn. 38501

[21] Appl. No.: 74,722

[22] Filed: Jul. 17, 1987

Related U.S. Application Data

[63] Continuation-in-part of Ser. No. 899,924, Aug. 25, 1986, Pat. No. 4,695,377.

[51] Int. Cl.$^4$ .............................................. B01D 27/08
[52] U.S. Cl. .................................. 210/132; 210/232; 210/340
[58] Field of Search ............... 210/248, 438, 456, 458, 210/232, 238, 335, 336, 130, 132

[56] References Cited

U.S. PATENT DOCUMENTS

| | | | |
|---|---|---|---|
| 2,098,725 | 11/1937 | Hurn | 210/131 |
| 2,318,276 | 5/1943 | Worthington | 210/90 |
| 2,606,628 | 8/1952 | Hasselwander | 210/438 X |
| 2,801,006 | 7/1957 | Hultgren et al. | 210/438 X |
| 2,886,180 | 5/1959 | Morgan et al. | 210/438 |
| 3,344,923 | 10/1967 | Pall et al. | 210/90 |
| 3,390,778 | 7/1968 | Uhen | 210/335 X |
| 3,552,553 | 1/1971 | Reading | 210/484 |
| 3,586,171 | 6/1971 | Offer | 210/136 |
| 3,975,273 | 8/1976 | Shaltz | 210/74 |
| 4,272,371 | 6/1981 | Moses | 210/168 |
| 4,640,772 | 2/1987 | Graham | |
| 4,695,377 | 9/1987 | Medley, III | 210/132 |

Primary Examiner—Frank Spear
Attorney, Agent, or Firm—Luedeka, Hodges & Neely

[57] ABSTRACT

An oil filter attaches to an internal combustion engine and filters the oil that is circulated through the engine. The filter includes a first can and a second can that may be attached together or separated apart. The first can attaches to the engine, and it has a first inlet and a first outlet for receiving oil from and transmitting oil to the engine. It also has a second inlet and a second outlet for receiving oil from and transmitting oil to the second can. The second can sealably attaches and detaches from the first can and, when attached, the second outlet of the first can is connected to an inlet of the second can, and an outlet of the second can is sealably connected to the second inlet of the first can. Filters are disposed within the two cans and flow directing apparatus is provided to direct the oil from the engine, through the two filters in series and back to the engine. In alternate embodiments, the cans include removable lids so that the filter element may be removed from a can. Also, a cap is provided for covering and sealing against one end of a can so that a single can may be used alone as a filter.

9 Claims, 3 Drawing Sheets

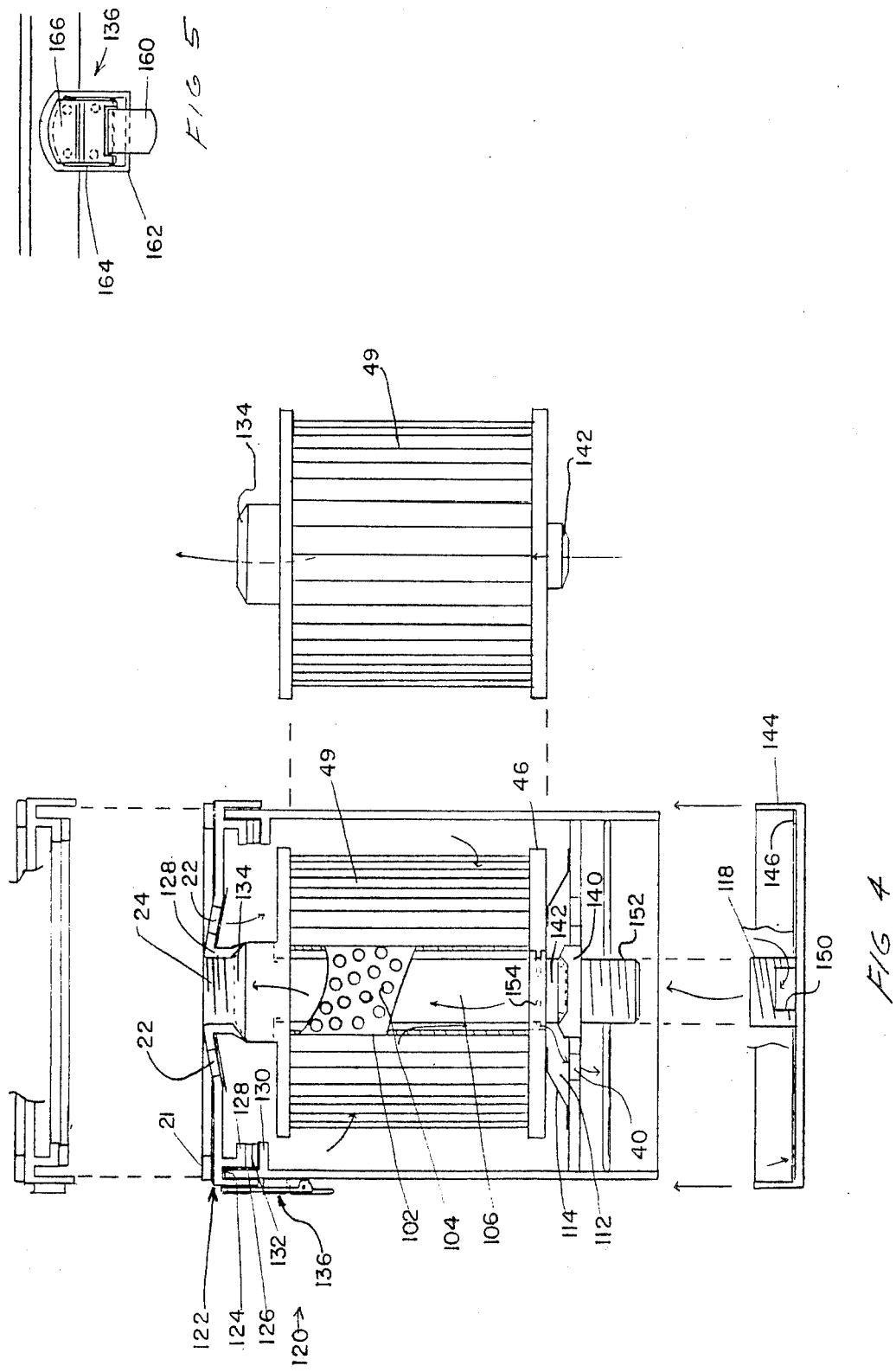

FLUID FILTER HAVING SEPARABLE ELEMENTS AND REMOVABLE END CLOSURES

This application is a continuation-in-part of U.S. Ser. No. 899,924, filed Aug. 25, 1986, now U.S. Pat. No. 4,695,377.

FIELD OF INVENTION

The present invention relates to fluid filters and particularly relates to an oil filter made up of two elements that may be detached one from the other.

BACKGROUND AND SUMMARY OF INVENTION

In many internal combustion engines it is desirable to filter the engine oil with two different types of filters, a full flow filter and a partial flow filter. The full flow filter is series connected to the oil circuit of the engine so that all of the oil circulating through the engine passes through the full flow filter, while the partial flow filter is connected to the oil circuit so that it receives a portion of the oil flowing through the engine. Typically, the partial flow filter is connected in parallel with a bypass device that carries a portion of the oil around the partial flow filter, and since the partial flow filter is not required to filter the full oil flow, it is usually designed to filter smaller particles from the oil as compared to a full flow filter.

At present, full flow and partial flow filters in an internal combustion engine are usually installed as separate filters which requires separate mounting systems and separate plumbing to invade the oil circuit of the engine in two different places. In some internal combustion engines it is difficult to provide sufficient space for two separate filters, and the hardware and labor needed to mount the second filter adds expense to the engine.

While present systems for providing full flow and partial flow filters are adequate, it would be preferred to use a single filter that would equal the performance of the two filter system. To achieve this goal, the present invention provides a filtering system in which two filters are detachably attached together and function as a single unit requiring only one mounting system on the engine. In a preferred mode, one of the filters would be a full flow filter, and the other would be a partial flow filter.

In accordance with the present invention, an oil filter is provided for attachment to an engine filter base having an engine outlet for transmitting oil under pressure to the filter and having an engine inlet for receiving oil from the filter. The filter includes first can defining a first filter chamber having first and second ends. A first inlet receives oil into the first end of the first can, and a first outlet transmits oil from the first end of the first can. A second inlet receives oil into the second end of the first can, and a second outlet transmits oil from the second end of the first can. A second filter can defines a second filter chamber and includes a third inlet and a third outlet for receiving oil into and transmitting oil from the second can. First attachment apparatus is provided for detachably attaching the first end of the first can to the engine filter base and for sealably interconnecting the engine outlet with the first inlet and the engine inlet with the first outlet of the first can. A second attachment apparatus is provided for detachably attaching the second can to the second end of the first can and for sealably interconnecting the second outlet to the third inlet and the second inlet to the third outlet. First and second filter elements are disposed, respectively, in the first and second cans and a first flow directing device directs the oil flow in the first can from the first inlet to the second outlet and from the second inlet to the first outlet. This first flow directing apparatus is operable to direct at least some of the oil flow through the first filter element as the oil flows through the first can. A second flow directing means directs oil flow within the second can from the third inlet, at least partially through the second filter element and to the third outlet. In this construction, a single filter is constructed of two separable cans containing filter elements, either of which may be a full flow or a partial flow filter.

The oil filter of the present invention offers the performance and separation of two separate filters, a full flow filter and a partial flow filter, and yet it has the convenience and engine mounting simplicity of a single filter. The separability of the two filter cans allows a user to replace or clean the individual filter cans at different times and results in a more versatile overall filter. This separability also enables the convenient use of a permanent filter element in one can and a disposable filter element in the other can, if desired. For example, a truck engine will be operated in many different environments and the filter will be required to remove different quantities of particulates and water depending upon the environment. If few particulates are encountered in the oil, but the water content of the oil is high, the partial flow filter, which is usually designed to remove the water, may need changing more frequently. However, if the oil contains many large particles, but little water, the opposite result may occur, and the full flow filter must be changed more frequently. The separability of the two filter cans of the present invention allows either of the filters to be replaced or cleaned as needed.

The present oil filter also offers human engineering advantages. While the filter handles and fits the engine as a single filter, the owner can see that he has two filter cans, representing two filters to the owner, and he can easily take them apart. Since the filters are positioned in a side-by-side engaging relationship within the engine compartment, they will be exposed to the same environment and a visual inspection of the side-by-side filters will normally enable one to determine which filter was most recently installed. It is easy for the owner to visually inspect to insure that a mechanic has replaced the correct one of the filters. Thus, while the separability of the two filter cans provides functional advantages from a purely mechanical viewpoint, it also provides psychological or human eengineering advantages.

In accordance with alternate embodiments of the present invention, the first and second cans may be provided with removable lids configured so that access is provided to the filter elements when the lids are removed. The access is dimensioned such that the filter elements may be removed from or inserted into the cans through the access.

Also, the first can, in a preferred embodiment, may include an end cap for detachably sealing and engaging the second end of the can. This end cap is configured to direct fluid flow from the second outlet to the second inlet of the can. Preferably, the end cap would simply screw onto the second end of the first can and sealably engage the can in the same manner as the second can is attached to the first can. In this construction, the first can may be used with an end cap to function as a single element filter, or two cans of the first type may be screwed together leaving the second end of the one of the cans open. Then, the end cap may be used to close the open end. Thus, two filter cans of the first type may be screwed together to create a two stage filter similar in function to that disclosed in FIG. 1.

While the invention in its preferred form has been described above as fluid oil filter for a motor vehicle, will be understood that this filter can be used in a wide variety of fluid filtering applications.

BRIEF DESCRIPTION OF THE DRAWINGS

The present invention may best be understood by reference to the following Detailed Description of Preferred Embodiments when considered in conjunction with the drawings in which:

FIG. 4 is a diagrammatical cross-sectional view of an alternate embodiment showing a removable lid, a removable filter element, and a removable end cap; and FIG. 5 is a detailed view of a clasp used to secure the removable lid to the filter can.

DETAILED DESCRIPTION

Figure 1:
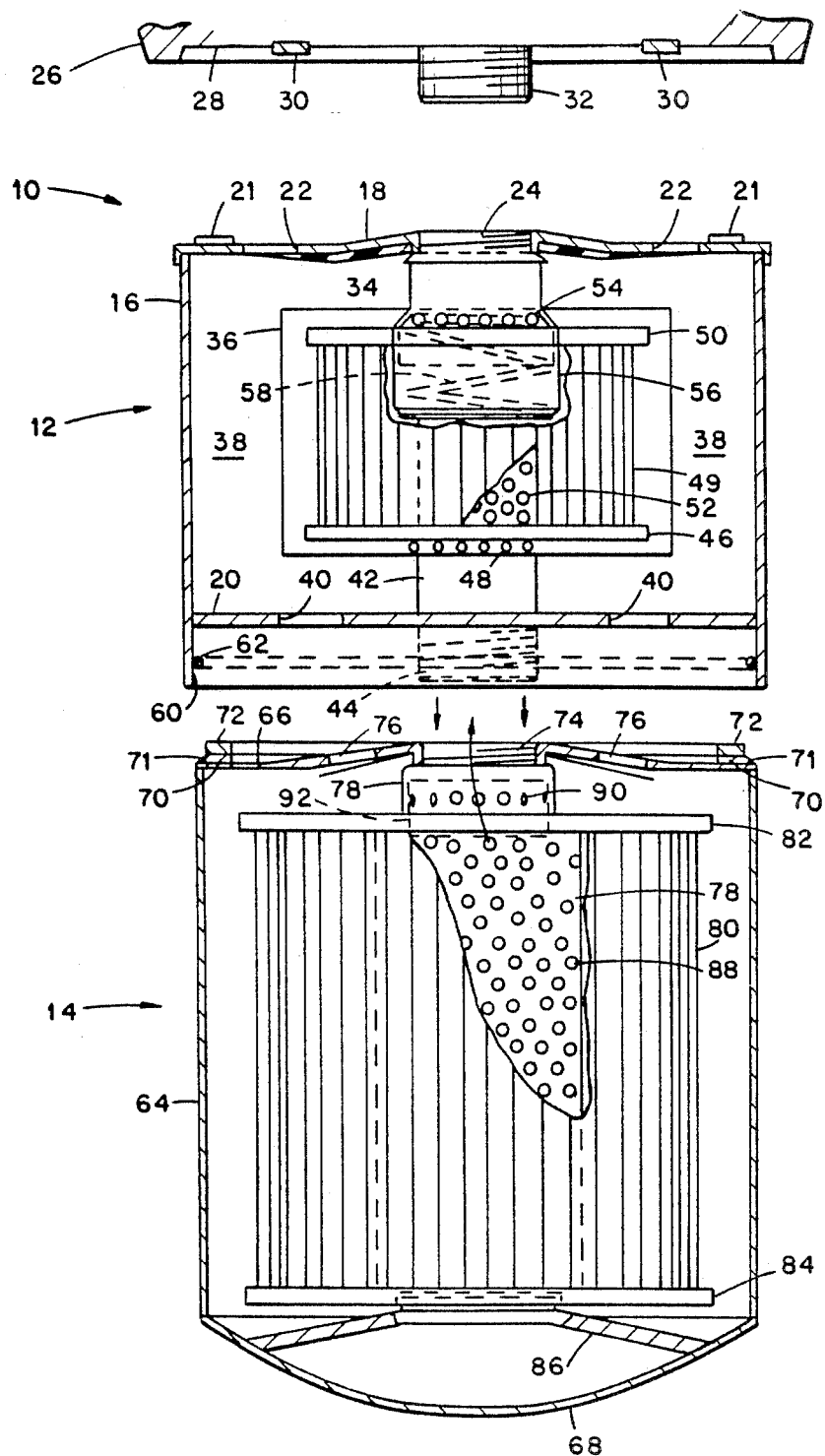
FIG. 1 is a somewhat diagrammatical cross-sectional view of a filter having two filter cans threadedly attached together that function as one filter and constitute one form of the present invention.

Referring now to the drawings in which like reference characters designate like or corresponding parts throughout the several views, there is shown in FIG. 1, a filter 10 embodying one form of the present invention. The filter 10 includes a first filter can 12 and a second filter can 14 that may be threadedly attached together, but in FIG. 1 they are shown spaced apart and in position for being screwed together.

The first can 12 is constructed with cylindrical sidewalls 16 with an upper end plate 18 mounted on one end of the cylindrical wall 16 and a lower end plate 20 mounted within the cylinder of the cylindrical wall 16 and proximate to the lower end of the cylindrical wall 16. Both of the end plates 18 and 20 are circular in shape and are dimensioned to mate with the cylindrical sidewalls.

A cylindrical sealing ring 21 is mounted on the outside face of the upper end plate 18 adjacent to the perimeter of the plate, and a plurality of inlet parts 22 are formed in the upper plate 18 at positions inwardly from the sealing ring 21. A threaded aperture 24 is formed in the center of plate 18. This aperture 24 constitutes an oil outlet for the can 12 and it also functions to threadedly secure the first can 12 to an internal combustion engine or another source of oil.

To illustrate how the first can 12 is connected to a source of oil, an engine oil filter base 26 is shown immediately above the can 12. This base includes a cylindrical mounting face 28, preferably circular in shape, and a threaded nipple 32 extending outwardly from the center of the mounting face 28. Oil outlet ports 30 are disposed concentrically around the nipple 32, and nipple also functions as an oil inlet.

The first can 12 is threadedly secured to the engine filter base by inserting the nipple 32 into the threaded aperture 24 and rotating the can 12 until the sealing ring 20 engages the face 28 of the engine filter base 26. It will be appreciated that the oil outlet ports 30 are positioned so that they will be disposed inwardly from the sealing ring 21 when the first can 12 is attached to the filter base 26. Thus, the sealing ring 21 forms a seal around the oil outlet ports 30 and the inlet ports 22 of the first can 12. A washer or other sealing means is provided so that the threaded interconnection between nipple 32 and threaded aperture 24 forms a seal as well. In this configuration, oil may flow out of the engine through oil port 30 and into the first can 12 through the oil inlet ports 22. Also, oil flows from the first can 12 back to the engine base 26 by flowing through and out of the threaded aperture 24 and into the threaded nipple 32.

A tube 34 extends downwardly from the threaded aperture 24 into the can 12 where an interior can 36 is mounted on the tube 34 within the can 12. The volume defined between the cylindrical sidewalls 16 and the interior can 36 constitutes a cylindrical passageway 38, and outlet ports 40 are formed in the lower and plate 20 so that oil may flow into the can 12 through the inlet ports 22, through the passageway 38 and through the outlet ports 40. A second tube 42 is concentrically disposed within the can 12 and extends through the center of the plate 20. The outer end of the tube 42 is threaded and forms a threaded nipple 44 which will hereinafter be described in greater detail. The second tube 42 extends into the can 36 and terminates at a lower plate 46. Apertures 48 are formed in the tube 42 within the interior can 36 so that oil may flow from the tube 42 out of the apertures 48 and around the lower plate 46. A radial flow filter element 48 is mounted between the lower plate 46 and against an upper plate 50. The upper tube 34 extends downwardly through the upper plate 50 and terminates at the lower plate 46, and apertures 52 are formed in the tube 34 at positions between the upper and lower plates 46 and 50. Thus, oil may flow radially from the interior of can 36, through the radial flow filter element 49 and into the tube 34 through the apertures 52. The oil flowing into the tube 34 will then exit the first can through the threaded aperture 24 and the threaded nipple 32.

Apertures 54 are also formed in the tube 34 above the upper plate 50 but still within the interior can 36. These apertures are normally closed by a bypass valve 56 that is mounted within the can 36 on the tube 54. A spring 58 controls the bypass valve 56 so that it is normally closed and blocks the flow of oil through the apertures 54. However, if the oil pressure within the can 36 relative to the oil pressure within the tube 34 exceeds a predetermined amount, the bypass filter will open and allow oil to flow from the interior of the can 36 through the apertures 54 and into the tube 34. Under these conditions, the bypass valve 56 will maintain a predetermined pressure drop between the interior of the can 36 and the interior of the tube 34 so that at least a portion of the oil may continue to flow through the filter element 48 and into the tube 34. In this construction, the filter element 49 may be chosen to filter fine particles and it need not be required to carry the full flow of the oil that is being circulated through the engine. Also, the bypass valve 56 performs a safety function in that it will allow oil to bypass the filter element 49 in the event that it becomes completely clogged.

Referring to the lower portion of the first can 12, it will be appreciated that a sleeve portion 60 is formed by the cylindrical walls 16 at a position below the lower end plate 20. Mounted within the sleeve portion 60 is an O-ring 62 that helps form the seal with the second can 14. Located immediately below the first can, there is shown in FIG. 1, a second can 14 that includes cylindrical sidewalls 64 an upper end plate 66 covering the top end of the cylindrical sidewall 64 and a curved lower endplate 68 closing the bottom end of the cylindrical sidewall 64. The upper plate 66 includes a flange 70 that extends around the periphery of the plate 66 and has a curved annular recess 71 formed therein for receiving the O-ring 62. When the second can 14 is mounted on the first can 12, it fits within the sleeve portion 60 and the O-ring 62 is received into the recess 71 and forms a seal between the flange 70 and the interior of the sleeve portion 62. An annular sealing ring 72 is also mounted on the top of the flange 70 and it functions to engage and seal against the lower surface of the plate 20.

At the center of the plate 66 is a threaded aperture 74 that is dimensioned to receive the threaded nipple 44. This arrangement is essentially identical to the threaded aperture 24 and threaded nipple 32. Again, a washer or similar sealing device is used to form a seal between the threaded aperture 74 and nipple 44.

Disposed between the threaded aperture 74 and the sealing ring 72 are inlet ports 76 formed in the plate 66. These ports 76 allow oil to enter the second can 44 from the outlet ports 40 that are formed in plate 20 of the first can 12. A central tube 78 extends downwardly into the second can 14 and a filter 80 is mounted on the tube 78. The filter 80 includes an upper plate 82 and a lower plate 84 with the filter media extending therebetween. The tube 78 extends through the upper plate 82 and terminates at the lower plate 84, and a bracket 86 is provided for supporting the lower plate 84 on the curved plate 68. Apertures 88 are formed in the tube 78 as it passes through the filter 80 so that oil may flow from the outside of the filter 80 through the filter and into the apertures 88. Apertures 90 are formed in the tube 78 above the upper plate 82 and these apertures are controlled by a bypass valve 92 that is essentially identical to the valve 56. The function of bypass valve 92 is to allow oil to escape from the second can 14 if the filter 80 is completely clogged.

Referring now to the top portion of FIG. 1, in operation, oil flows from the engine through ports 30 in the oil filter base 26 and into the first can 12 through the inlet ports 22. The oil then flows through the passageway 80, around the interior can 34, and out of the first can 12 through the outlet ports 40. The oil from ports 40 enters the second can 14 through inlet ports 76 and then flows around the upper plate 82 and through the filter 80 and the apertures 88 into the center tube 78. The filtered oil exits the second can 14 through the threaded aperture 74 and the threaded nipple 44 and enters the tube 42. This filtered oil exits the tube 42 through apertures 48 and flows around the lower plate 56 and into and through the filter 48 and the apertures 52. After the oil flows through the apertures 52, it has entered the tube 34 and it exits the second can 12 through the threaded aperture 24 and threaded nipple 32 as it returns to the engine filter base 26. An alternate route for the oil to follow within the interior can 36 is through the bypass valve 56. If for any reason the full flow of the oil cannot pass through the filter 49, the oil pressure differential between the interior of the can 36 and the interior of the tube 34 will rise to the point that the bypass valve 56 will open and allow at least some of the oil to pass through the apertures 54. In like manner, when the pressure differential between the interior of the second can 14 and the interior of the tube 42 rises to a predetermined level, the bypass valve 92 will open and allow oil to flow from the interior of the can 14 through the apertures 90 and into the tube 42.

While radial flow filters have been shown in the embodiment illustrated in FIG. 1, it will be understood that numerous different types of filters may be used. For example, axial flow filters could be mounted in one or both of cans 12 to 14. Likewise, it is preferred, but not necessary, that the oil be filtered in the second can 14 prior to being filtered in the first can 12. Also, in the above description, the terms "upper" and "lower" were used only in reference to the position of structure as shown in the drawings. The filter 10 could assume any orientation in use.

Figure 2:
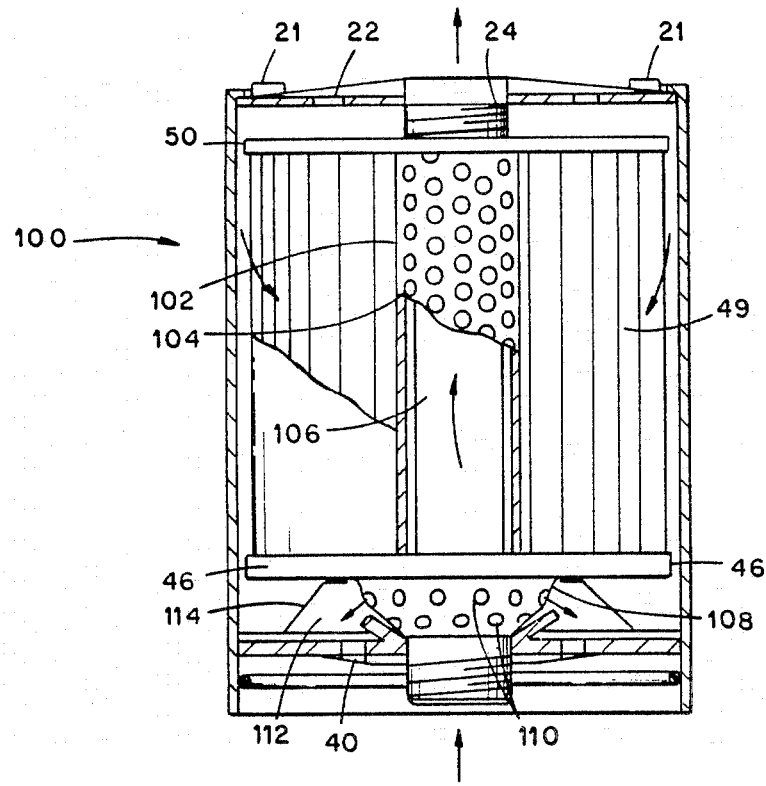
FIG. 2 is a diagrammatical cross-sectional view of an alternate embodiment illustrating a different oil flow path through two filter cans.

In FIG. 2, there is shown a filter can 100 that can be substituted for the first filter can 12 shown in FIG. 1. Can 100 is constructed similarly to can 12 in terms of outward appearance. However, internally, the oil within can 100 flows through filter 49 before it is delivered to the second can 14. In the can 100 there is no interior can 36 and the oil is allowed to enter can 100 through the ports 22 and immediately flow through the filter 49. At the center of the filter 49 there is a tube 102 having a plurality of apertures 104 formed therein. A second tube 106 is disposed coaxially within the tube 102 and the oil flowing through the apertures 104 is received into the volume defined between the two tubes 102 and 106. Tube 102 terminates and is sealed against the upper plate 50 but it extends through the lower plate 46. The inner tube 106 extends through and is sealed against both plates 50 and 46. The oil flowing through tube 102 enters a receptacle 108 having a plurality of apertures 110 formed therein, the oil flows through the receptacle 108 and 110 aperture into an annular chamber 112 defined by walls 114, and then the oil flows out of the outlet ports 40 and is available to be filtered by the second can 14.

Figure 3:
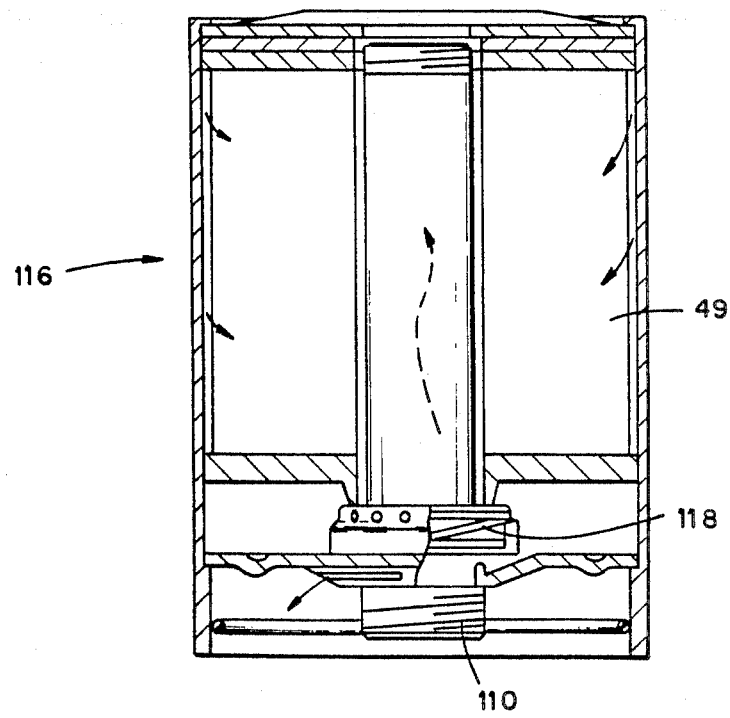
FIG. 3 is another cross-sectional view of an alternate embodiment similar to that shown in FIG. 2 and having an additional bypass valve.

FIG. 3 illustrates a filter can 116 that is essentially identical to that of filter can 100. except that a bypass valve 118 is disposed at the bottom of the can. This bypass valve 118 allows the oil to flow directly to the second can, such as can 14, without flowing through the filter 49 when a predetermined pressure differential exists between the interior of the can 116 and the interior of the tube 110. The bypass valve 118 is a safety measure in that it will allow the oil to flow out of the can 116 even when the filter 49 is completely clogged and it also allows the use of a partial flow filter within can 116 if desired.

Referring now to FIG. 4, an alternate embodiment of the apparatus shown in FIG. 2 is disclosed. In this embodiment, a can 120 is provided with a removable lid 122. Formed on the outer periphery of the lid 122 is a recess 124 that is dimensioned to snugly receive the rim 126 of the can 120. This recess and rim interconnection serves to position the lid 122 on the can 120. Formed about the periphery of the lid 122, but interior of the recess 124, is a shoulder 128, and a mating annular land 130 is formed on the upper end of the can. Annular seals 132 are disposed between the shoulder 128 and the land 130 and, thus, form a seal between the lid 122 and the can 120. In the center of the lid 122, a threaded aperture 24 is formed that is substantially identical to the aperture 24 shown in FIG. 2. However, in this embodiment, the aperture 24 includes a sealing sleeve 128 that is configured to engage a truncated upper end 134 of the filter element 49. The lid 122 may be removably secured to the can 120 by numerous conventional means, but the preferred mechanism is an over the center type clasp 136 that will be described in greater detail in reference to FIG. 5.

At the lower end of the filter can 120, a seat 140 is dimensioned and disposed to receive the truncated conical lower end of the filter element 49 and sealably engage it. Also, walls 114 are disposed to engage and seal against the filter element 49 in the manner shown in FIG. 2.

An end cap 144 is configured to mount on the lower end of the can 120. The cap 144 fits over the end of the can 122 and an annular rubber seal 146 engages the can to provide the seal. The cap 144 is secured on the can 120 by means of a threaded receiver 148 that includes apertures 150 formed therein. A threaded nipple 152 extends downwardly from the center of the can 120 and the receiver 148 is matingly threaded. The nipple 152 does not extend out of the end of the can 120 and, thus, when the cap 144 is securely fastened on the can 120, the apertures 150 is exposed such that oil may flow through the apertures 150 and into the end of the threaded nipple 152.

Referring to FIGS. 4 and 5, the clasp 136 is conventional in design and includes a lower lever 160 pivotally secured to a base plate 162 on the can 120. A bail 164 is pivotally secured to the lever 160 so that, as lever 160 is moved pivotally, the bail 164 moves vertically. A receiving book 166 is mounted on the lid 122 and is positioned to engage and firmly hook the bail when lower 160 is in its down position. The clasp 136 works on an over-the-counter clasping geometry to lock in the position shown in FIG. 5. It is preferred to use at least two clasps 136 disposed on opposite sides of the can 120.

In order to assemble the can 120 for use as a single filter only, a cap 144 is threaded onto the end of the can, and a filter element 49 is inserted through the access provided by the absence of the lid 122. After the filter element 49 has been inserted into the can 120, the lid 122 is secured thereon using clasps 136 as shown in FIG. 5, and the can 120 is now in a configuration to function as a filter. In this configuration, the can 122 may be secured to a filter base, such as base 26 shown in FIG. 1, and fluid will flow into the can 120 through the apertures 22. Once inside the can, fluid flows through the filter element 49, and through the apertures 104 in the outer tube 102. The oil then flows downwardly along the outer wall of the tube 106 and flows out of the tube through aperture 154 which are formed in the bottom of the filter element 49. At this point, the fluid is in an annular cavity defined by the walls 114 and the tube 106. The fluid then flows through the apertures 40 and into a cavity defined by the end cap 144. Then, the fluid flows through the apertures 150 and into the end of the threaded nipple 152. Thereafter, the fluid flows up the tube 106 and is returned to the filter base 28 through the threaded nipple 32 shown in FIG. 1.

It will be appreciated that since the can 120 can function as a single element filter, two cans 120 may be designed to function as cans 12 and 14 shown in FIG. 1. In such case, can 120 would be designed so that another identical can may be threadedly secured to the lower end thereof. In this configuration, a first can 120 would be used as can 12 shown in FIG. 1, and a second can 120 would be used as can 14. The second can 120 would include an end cap 144.

In the above discussion, can 120 is described without reference to any by-pass valves and the filter element 49 is shown as a full flow element. It will be appreciated that a by-pass valve could be used in either the top or the bottom of the can 120 in a manner similar to that shown in FIGS. 1, 2, and 3. In such case, the filter element used inside can 120 may be either a full-flow filter or a by-pass filter and different types of media could be used inside the can 120 depending on the particular application. When two cans 120 are secured together to form a two-stage filter, it is contemplated that one of the filters would be a full-flow filter and the other will be a partial flow filter and will utilize a by-pass valve.

It will also be appreciated that the can 120 is ideally suited for use with a permanent filter media since the filter element 49 may be removed through the access provided by the lid 122. In such case, the permanent filter media may be removed, cleaned, and then reinserted into the filter can 120.

Although particular embodiments have been described in the foregoing detailed description, it will be understood that the invention is capable of numerous rearrangements, modifications and substitutions of parts without departing from the scope of the invention as defined in the following claims.

What is claimed is:

1. A fluid filter for attachment to a filter base having a base outlet for transmitting fluid under pressure to the filter and having a base inlet for receiving fluid from the filter;

a can defining a cavity and having first and second ends;

first inlet means for receiving fluid into the first end of said can;

first outlet means for transmitting fluid from the first end of said can;

second inlet means for receiving fluid into the second end of said can;

second outlet means for transmitting fluid from the second end of said can;

first attachment means for detachably attaching the first end of said can to the filter base and for sealably interconnecting the base outlet with said first inlet means of said can and the base inlet with the first outlet means;

second attachment means configured for detachably attaching the second end of said can to the first end of said can and for sealably interconnecting said second outlet to said first inlet and said second inlet to said first outlet, whereby two of said cans may be attached together with the oil being delivered between said two cans from the first outlet of one can to the second inlet of the other can and to the first inlet of one can from the second outlet of the other can;

flow directing means for directing fluid flow in said can from said first inlet means to said second outlet means and from said second inlet means to said first outlet means;

said flow directing means being configured and operable to direct at least some fluid flow through said cavity;

end cap means for sealably engaging the second end of said can and being configured to direct fluid flow from said second outlet to said second inlet of said can; and means for detachably fastening said end cap means to the second end of said can.

2. The apparatus of claim 1 further comprising;

a removable closure forming the first end of said can; and means for detachably fastening said removable closure to said can.

3. The apparatus of claim 2 wherein said means for detachably fastening comprises;

at least one clasp mounted on the outside of said can and configured to extend to the closure; and hook means formed on the closure for engaging and holding said clasp.

4. The apparatus of claim 2 further comprising;

an annular land formed along the periphery of said can;

an annular shoulder formed on said closure and configured to mate with said annular land; and an annular seal dimensioned and disposed to fit between said land and shoulder.

5. The apparatus of claim 1 further comprising:

at least a second can defining a second cavity;

third inlet means for receiving fluid into said second can;

third outlet means for transmitting fluid from said second can; and second flow directing means for directing fluid flow in said second can from said third inlet, at least partially through said second cavity, and to said third outlet.

6. The apparatus of claim 1 wherein said end cap means further comprises means for detachably attaching said end cap means to second end of said can.

7. The apparatus of claim 1 wherein said end cap means further comprises:

an end cap;

a threaded nipple and receptacle interconnection between said can and said end cap for threadedly securing said end cap into sealing engagement with the second end of said can.

8. A fluid filter for attachment to a filter base having a base outlet for transmitting fluid under pressure to the filter and having a base inlet for receiving fluid from the filter;

a can defining a filter chamber and having first and second ends;

first inlet means for receiving fluid into the first end of said can;

first outlet means for transmitting fluid from the first end of said can;

second inlet means for receiving fluid into the second end of said can;

second outlet means for transmitting fluid from the second end of said can;

first attachment means for detachably attaching the first end of said can to the filter base and for sealably interconnecting the base outlet with said first inlet means of said can and the base inlet with the first outlet means;

flow directing means for directing fluid flow in said can from said first inlet means to said second outlet means and from said second inlet means to said first outlet means;

a filter element disposed in said can;

said flow directing means being configured and operable to direct at least some fluid flow through said filter element;

second attachment means formed on the second end of said can;

end cap means configured to engage said second attachment means and sealably engage the second end of said can, said end cap means being configured to direct fluid flow from said second outlet to said second inlet of said can;

at least a second can defining a second filter chamber;

third inlet means for receiving fluid into said second can;

third outlet means for transmitting fluid from said second can;

a second filter element disposed in said second can;

second flow direction means for directing fluid flow in said second can from said third inlet, at least partially through said second filter element, and to said third outlet;

said second attachment means including means for detachably attaching said second can to the second end of said first can and for sealably interconnecting said second outlet to said third inlet and said second inlet to said third outlet;

a removable closure forming the first end of at least one of said cans;

means for detachably fastening said removable closure to said at least one can; and said removable closure and can being configured to provide access to said filter whereby said filter may be removed from, and inserted into, said can through said access.

9. A fluid filter for attachment to a filter base having a base outlet for transmitting fluid under pressure to the filter and having a base inlet for receiving fluid from the filter;

a can defining a cavity and having first and second ends;

first inlet means for receiving fluid into the first end of said can;

first outlet means for transmitting fluid from the first end of said can;

second inlet means for receiving fluid into the second end of said can;

second outlet means for transmitting fluid from the second end of said can;

first attachment means for detachably attaching the first end of said can to the filter base and for sealably interconnecting the base outlet with said first inlet means of said can and the base inlet with the first outlet means;

second attachment means for detachably attaching the second end of said can to the first end of said can and for sealably interconnecting said second outlet to said first inlet and said second inlet to said first outlet, whereby two of said cans may be attached together with the oil being delivered between said two cans from the first outlet of one can to the second inlet of the other can and to the first inlet of one can from the second outlet of the other can;

flow directing means for directing fluid flow in said can from said first inlet means to said second outlet means and from said second inlet means to said first outlet means;

said flow directing means being configured and operable to direct at least some fluid flow through said cavity;

a removable closure forming the second end of said can; and means for detachably fastening said removable closure to said can.

* * * * *